(12) United States Patent
Alberi et al.

(10) Patent No.: US 8,572,555 B2
(45) Date of Patent: Oct. 29, 2013

(54) AUTOMATED TESTING OF SOFTWARE WITH TARGETING OF DEEP PATHS

(75) Inventors: James L. Alberi, Holmdel, NJ (US); Hiralal Agrawal, Bridgewater, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 994 days.

(21) Appl. No.: 12/632,859

(22) Filed: Dec. 8, 2009

(65) Prior Publication Data

US 2011/0138229 A1    Jun. 9, 2011

(51) Int. Cl.
*G06F 9/44* (2006.01)
*G06F 9/45* (2006.01)

(52) U.S. Cl.
USPC ........... 717/106; 717/109; 717/124; 717/131; 717/132; 717/144

(58) Field of Classification Search
None
See application file for complete search history.

(56) References Cited

U.S. PATENT DOCUMENTS

| | | | | |
|---|---|---|---|---|
| 6,996,806 | B2 * | 2/2006 | Bates et al. | 717/125 |
| 7,861,226 | B1 * | 12/2010 | Episkopos et al. | 717/124 |
| 2010/0180258 | A1 * | 7/2010 | Takahashi | 717/124 |

OTHER PUBLICATIONS

Godefroid, Patrice et al., "Automated Whitebox Fuzz Testing," http://research.microsoft.com/en-us/projects/atg/ndss2008.pdf.
Godefroid, Patrice et al., "Automating Software Testing Using Program Analysis," IEEE Computer Society, IEEE Software, vol. 25, No. 5, pp. 30-37, Sep./Oct. 2008.
Lott, C. et al., "Modeling Requirements for Combinatorial Software Testing," Proceedings of the 1st International Workshop on Advances in Model Based Testing, ACM, New York, 2005.
Agrawal, Hira et al., "Efficient Coverage Testing Using Global Dominator Graphs," Proceedings of the ACM SIGPLAN-SIGSOFT Workshop on Program Analysis for Software Tools and Engineering (PASTE'99), Toulouse, France, pp. 11-20, Sep. 1999.
Agrawal, Hira et al., "Mining System Tests to Aid Software Maintenance," IEEE Computer Society, vol. 31, Issue 7, pp. 64-73, Jul. 1998.

* cited by examiner

*Primary Examiner* — Kris Rhu
(74) *Attorney, Agent, or Firm* — Philip J. Feig

(57) ABSTRACT

A method is provided for generating a test case for testing a program, which can include analyzing instructions of the program to identify basic blocks and superblocks, each basic block containing at least one executable instruction, and each superblock containing a plurality of basic blocks. The method can include executing instructions by a processor to perform determining respective weights of superblocks, each weight representing a number of basic blocks which require execution when the superblock is executed; determining the constraints which cause a superblock having a high weight to be executed, and using the determined constraints to generate a test case which, upon execution of the program, causes the high weight superblock to be executed.

18 Claims, 3 Drawing Sheets

AUTOMATED TESTING OF SOFTWARE WITH TARGETING OF DEEP PATHS

BACKGROUND OF THE INVENTION

1. Field of the Invention

The subject matter of the present application relates to the testing of computer programs, e.g., software and the like, and more specifically to a method of generating a test case for testing at least a portion of a program containing computer-readable instructions.

2. Description of the Related Art

Some existing techniques for testing a computer program, e.g., an application program, utilize a hit-and-miss approach for exercising the paths through the program. Such techniques typically do not acquire or utilize information to determine, prior to conducting a test, which parts of the program are linked together via multiple branch conditions. Such techniques typically do not attempt to determine paths which reach the deepest embedded functions of the program.

With such techniques, typically a random input generator is used to determine a set of the inputs on which a program branches from one path to another. When the program does not branch on one set of random generated inputs, the generator generates a new set of random inputs. It is then tested whether the program branches on the new set of random inputs. This process can be repeated many times until a set of inputs are determined which causes the program to branch to another path.

One consequence of relying upon a random input generator to supply a set of inputs for branching between different paths during testing is that such approach might not adequately cover the paths of the program. Although inputs are identified which cause the program to branch from some paths to other paths, no attempt is made to know the structure of the program and use knowledge of the program's structure to assure that the deeper functional elements of the program will be tested.

SUMMARY OF THE INVENTION

According to an aspect of the invention, a method is provided for generating a test case for testing a program. The program can contain a set of instructions recorded on a computer-readable medium which are executable by a processor. At least some of the instructions can be conditionally executable by a processor upon occurrence of a constraint. Such method can include executing instructions by a processor to perform a) analyzing at least some of the instructions to identify basic blocks and superblocks and to determine the constraints thereof, wherein each basic block contains at least one executable instruction, and each superblock contains a plurality of basic blocks. Typically, all basic blocks of each superblock require execution whenever any basic block thereof requires execution. This execution of all basic blocks composing a superblock is termed executing a superblock.

The method can further include executing instructions by a processor to perform b) determining respective weights of superblocks, wherein each weight is representative of a number of basic blocks which require execution when the superblock is executed; c) determining the constraints which cause a superblock having a high weight to be executed; and d) using the determined constraints to generate at least one test case which, upon execution of the program, is capable of causing the high-weighted superblock to be executed.

According to another aspect of the invention, an information processing apparatus is provided which includes a processor and a set of instructions which are executable to perform a method of generating a test case, such as described above.

According to another aspect of the invention, a computer-readable medium is provided which has instructions recorded thereon, wherein the instructions are executable to perform a method of generating a test case, such as described above.

DETAILED DESCRIPTION

Figure 1:
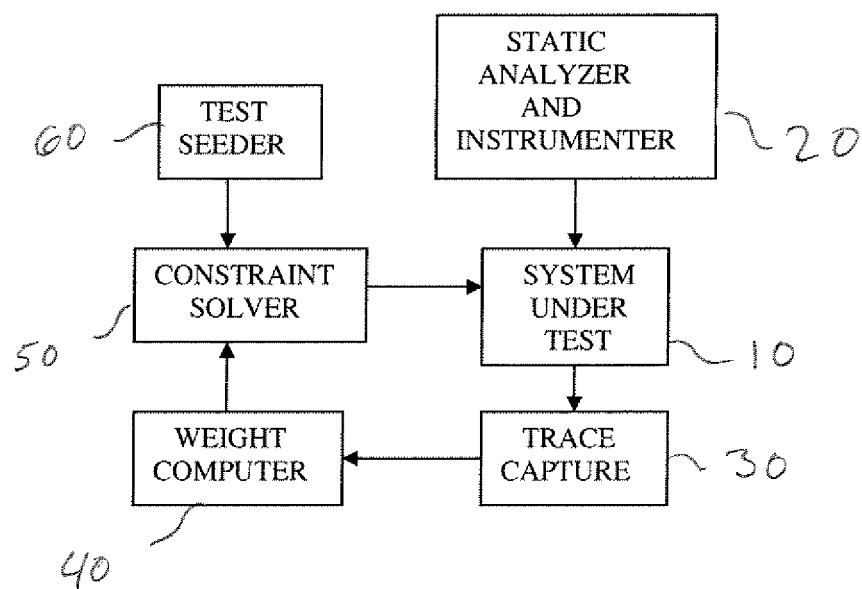
FIG. 1 is a block and schematic diagram illustrating a functional organization of an automated test case generator in accordance with an embodiment of the invention.

Accordingly, it is expected that embodiments of the invention described herein can exercise the paths in a program so as to reach more deeply into the program than the techniques referred to above in the background section herein. One important feature of a method provided herein is static analysis of the program which can be performed before attempting to solve the constraints of the program and exercising branches which provide for moving between the various paths in the program. Using static analysis, executable elements of the program can be identified and categorized as basic blocks; and as superblocks, which are derived from analysis of the basic blocks. The function of and numbers of basic blocks and superblocks can be determined. Basic blocks typically are simple executable blocks typically containing a plurality of instructions which are executed together. On the other hand, a superblock typically is a group of basic blocks which are executed together whenever any one of the basic blocks of the superblock is executed. A single basic block can be a superblock if that basic block can be executed without requiring another basic block to be executed.

Static analysis can also be used to determine the execution paths of the basic blocks contained in one superblock to those contained in another. Stated another way, static analysis can determine which superblock is executable when the program branches from a basic block contained in one superblock to that contained in another superblock. This determination defines branching relationships among superblocks. Static analysis can also determine a chain of branching relationships which lead from a superblock at an entry point in the program to another superblock which is separated from the entry point by one or more superblocks.

In addition to the branching relationships, static analysis can also determine the weight of a superblock at different points within the program. The "weight" of a given superblock represents a number of basic blocks which are required to be executed whenever the given superblock is executed. Static analysis can determine the weight of superblocks at diverse locations within the program. A given superblock can have a relatively high weight when the superblock is executable after branching from an antecedent superblock or a series of antecedent superblocks, and when the given superblock together with antecedent superblocks contains a relatively large number of superblocks. Alternatively, a superblock may have a relatively high weight because the superblock itself contains a relatively large number of basic blocks. In either case, executing the given superblock requires a relatively large number of basic blocks to be executed.

With the branching relationships and the weights of superblocks of the program now determined, particular superblocks can be selected and then executed. When relatively high weight superblocks are selected, a relatively large number of basic blocks are executed. By executing a high weight superblock, a significant amount of the functionality of the program can be tested. Moreover, executing a high weight superblock can exercise execution paths and branching deep within the program.

Even after such high weight superblock is executed, typically other superblocks of the program remain which may have relatively high weights. It can be desirable to test the program by executing such other superblocks of the program which do not belong to the superblocks that are executed when the high weight superblock is executed.

In one embodiment, it can be desirable to test a program in the following manner: calculate the weights of superblocks within the program, and select a first superblock for execution which has the highest calculated weight. That first superblock then is selected to be executed. The method now turns to determining a second superblock to be executed. The superblocks of the program and the execution paths therethrough are analyzed again in an updated analysis. However, when the program is analyzed this time, it is done assuming a condition that the first superblock has already been executed. Accordingly, the program is analyzed under an assumed condition that the first superblock and all its antecedent superblocks have already been executed. The weights of the first superblock and all its antecedent superblocks are set to zero. As a result, when performing the updated analysis to select a second superblock, the zero weight of the first superblock and its antecedents eliminate them from consideration. Since the first superblock and its antecedents were already selected for execution, there is no need to select again the first superblock or any of its antecedents to be executed. Accordingly, a second superblock can now be selected for execution which requires different superblocks to be executed than the superblocks that belong to the first superblock and its antecedents.

Having set forth a description of operation according to an embodiment of the invention, a detailed example can now be described with specific reference to the drawings. As seen in FIG. 1, the above-described operation can be performed using a set of functionally organized elements. A system under test ("SUT") 10 can include a program, i.e., a set of instructions which are executable by a computer to perform some operation and achieve some purpose. The SUT may include other elements, as well. For example, the SUT may include hardware, e.g., a field programmable gate array ("FPGA"), application specific integrated circuit ("ASIC"), associated memory device, etc., which can operate together with a program to perform the target operation.

The program of the SUT 10 can be complex, having many executable elements or instructions therein. The executable elements can be categorized as basic blocks and superblocks, as described above, where the basic blocks are partitionable into disjoint "superblocks", which are executable together. As typical of any complex program, at least some of the basic blocks can include instructions which perform conditional or unconditional branching, as will be explained more fully below.

A Static Analyzer and Instrumenter 20 has a two-fold purpose. This "Instrumenter" part of this element 20 can be used to instrument the SUT 10 with a tracing function so as to record the conditions under which the basic blocks and superblocks of the SUT 10 are subject to immediate execution. The "Static Analyzer" part of this element 20 determines branching relationships and branching conditions which govern how the control flow of the SUT shifts from one superblock to another within the SUT, thus making a particular superblock of the SUT subject to immediate execution. In one example, a particular superblock of the SUT might only become subject to execution if the control flow of the program branches from another specific SUT when a particular condition is met. During operation of the "Static Analyzer" function of this module, the trace function records the identity of superblocks within the program and the branching relationships and conditions which allow the control flow of the program to reach a particular superblock, thus making that particular superblock subject to execution.

During operation, i.e., during analysis of the SUT 10 by the "Static Analyzer" function, a "Trace Capture" module 30 records the values, e.g., branching conditions, etc., of parameters observed during the analysis. The information recorded by the Trace Capture module 30 can then be provided to a Weight Computer 40. Using the information from the Trace Capture module 30, the Weight Computer 40 can then determine weights of superblocks within the SUT 10. The Weight Computer 40 can determine from the branching relationships evident in the information recorded by the Trace Capture module 30, for example, that a particular superblock of the SUT has a weight of 12. A weight of 12 is established because executing such superblock requires that 12 basic blocks be executed. The weight of a given superblock is calculated as the number of basic blocks of all the superblocks that must be executed for the given superblock to become immediately executable, plus all the basic blocks that belong to the given superblock.

A constraint solver module 50 solves a set of constraints that must be provided as input to basic blocks of the SUT to enable execution of the superblocks. In particular, the constraint solver 50 obtains the weights of superblocks of the SUT from the weight computer 40 and then works on solving the constraints for executing one or more superblocks which have relatively high weight. A test seeder 60 module stores and provides seed input to the constraint solver 50. In turn, the constraint solver 50 provides a set of inputs to the SUT 10 which permit execution of the one or more superblocks of the SUT which have relatively high weights.

The operation of the automated testing embodiment referred to herein can be best described in conjunction with a specific example. Table 1 below is a listing of a program, i.e., a SUT, to be tested. As seen in Table 1, the SUT contains a listing of executable elements or basic blocks numbered consecutively 1, 2, 3, . . . 15, which are written in a high-level programming language such as C++, for example, although there is no limitation as to the programming language in which the program listing is written. As also seen in Table 1, the basic blocks are numbered consecutively 1, 2, 3, . . . 15. Each basic block contains a simple executable instruction. For example, block 1 contains the instruction "test_read (&N, &X); which directs the processor to read the values of the variables N and X from their respective locations. Some instructions are conditional, because they include the "WHILE" or "IF" operator and require determining whether or not statement is true. Basic blocks numbered 2, 5, 7, 9, 13 are conditional type instructions.

TABLE 1

```
        void main( ){
          int N, X;
1         test_read(&N, &X);
2         while (N > 0){
3           X = f1(N, X);
          }
4         test_write(X);
        }
        int f1 (int& N, int X){
5         if(X != 0){
6           X = f2(N, X);
          }
7         if(X < N){
8           X = f3(N, X);
          }
9         if(N > 0){
10          N = N - 1;
          }
11        return X;
        }
        int f2(int N, int X){
12        return N - X;
        }
        int f3(int N, int X){
13        if(N != X){
14          X = X + N
          }
15        return X;
        }
```

With the basic blocks of the program listing shown in Table 1, the Static Analyzer and Instrumenter 20 adds a tracing capability to the SUT and performs a static analysis of the basic blocks and their branching relationships. This analysis can also determine the weights of the superblocks within the SUT. For example, FIG. 2A illustrates an example of the results of the analysis, after tracing operation of the program, capturing traces of its operation via the Trace Capture function 30, and computing the respective weights of the superblocks.

Figures 2A, 2B:
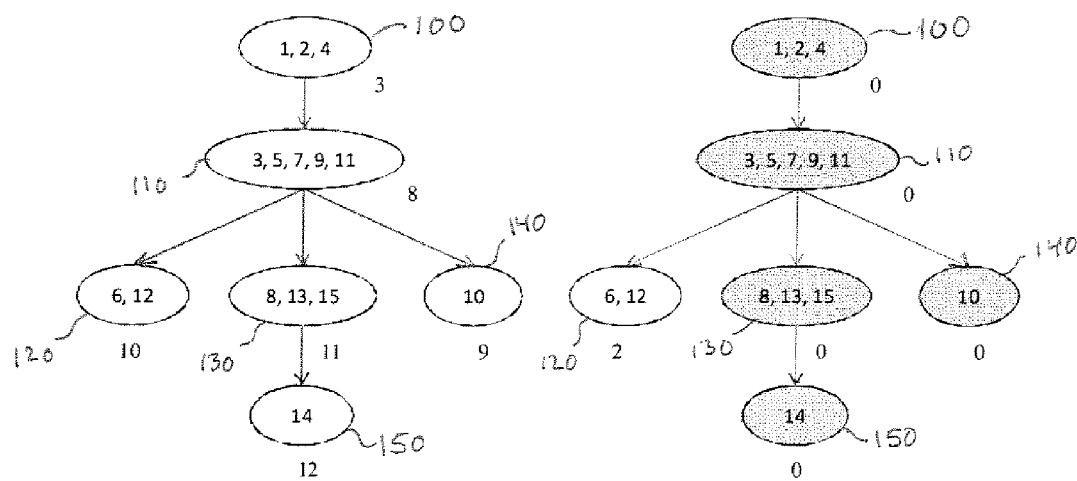
FIG. 2A is a schematic diagram illustrating an analysis of a program, depicting superblocks and their weights, and relationships among superblocks, as can be created by an automated test case generator (FIG. 1) in accordance with an embodiment of the invention.
FIG. 2B is a schematic diagram illustrating an updated analysis of a program, depicting superblocks and their updated weights after executing a high-weight superblock thereof.

As depicted in FIG. 2A, the analysis determines that a particular superblock 100 contains basic blocks 1, 2, 4 (i.e., the executable instructions at lines 1, 2, and 4 of the program listing in Table 1). Superblock 100 has a weight of 3, as indicated in the number shown immediately below that superblock. The weight indicates that executing superblock 100 requires execution of three superblocks. Other superblocks have greater weights, because they are deeper within the program, and hence, can only be reached after first executing at least one other superblock. The arrows in FIG. 2A which point downward to other superblocks indicate a relationship that execution of the superblock at the tip of an arrow implies execution of the superblock at the base of the same arrow.

Specifically, the analysis depicted in FIG. 2A indicates that superblock 100 branches to another superblock 110. Also, the analysis indicates that superblock 110 has a weight of eight. This conclusion also follows from the analysis' determination that superblock 100 contains three basic blocks and superblock 110 contains 5 basic blocks, and, the arrow between superblocks 100, 110 indicating that superblock 110 can only be executed when superblock 100 is executed. By the same kind of analysis, it is determined that superblock 120 contains two basic blocks and has a weight of 10, superblock 130 has a weight of 11 and superblock 140 has a weight of 9. Also, superblock 150 has a weight of 12.

From the weights of the superblocks, it can also be determined which superblocks exercise deep execution paths within the SUT. Specifically, execution of superblock 150, having the highest weight, exercises the deepest execution path depicted in FIG. 2A. This is also evident from the three arrows between the entry point in the program (superblock 100) and the superblock 150, each of which indicates branching between superblocks.

Now that the weights of the superblocks have been computed, a constraint solver 50 (FIG. 1) is put to work to determine a set of inputs to be provided to the program to enable a superblock of relatively high weight, or, possibly, a highest weight superblock, to be executed. The constraint solver determines a test case, i.e., a set of predicates that enable execution of superblock 150 of the program (SUT) depicted in Table 1 and every other superblock between the entry point (superblock 100) and it. The constraint solver determines that the predicates of $N_0=1$, $X_0=0$ have the correct values.

Applying the test case to the program (SUT) being tested, i.e., applying the determined predicate values to the SUT (Table 1) and tracing the changes in variables as the program executes, generates the following path constraint:

$(N_0>0, X_0==0, X_0<N_0, N_0!=X_0, N^1_0=N_0-1, N^1_0<=0)$.

Referring to FIG. 2b, after applying the test case, i.e., the predicates ($N_O=1$, $X_0=0$), to the SUT, each of the superblocks 100, 110, 130 and 150 in the same path are executed. It is also noted that even though superblock 140 is not in the direct path between the superblock 100 and superblock 150, it nevertheless is also executed because the applied predicates also enable execution of superblock 140. After executing superblocks 100, 110, 120, 120, 140 and 150, the weights of all of these superblocks are updated to "0" (zero).

However, at this time one superblock 120 of the SUT remains to be executed because the supplied predicates did not permit that superblock 120 to execute. The weight of superblock 120 now is indicated in the analysis as "2" because its execution will only cause the two basic blocks contained therein to be executed.

At this point, the constraint solver 50 (FIG. 1) can be used again to determine predicates which will permit superblock 120 (FIG. 2B) to be executed. Then, after superblock 120 is executed, the analysis can now update the weight of superblock 120 to "0".

Figure 3:
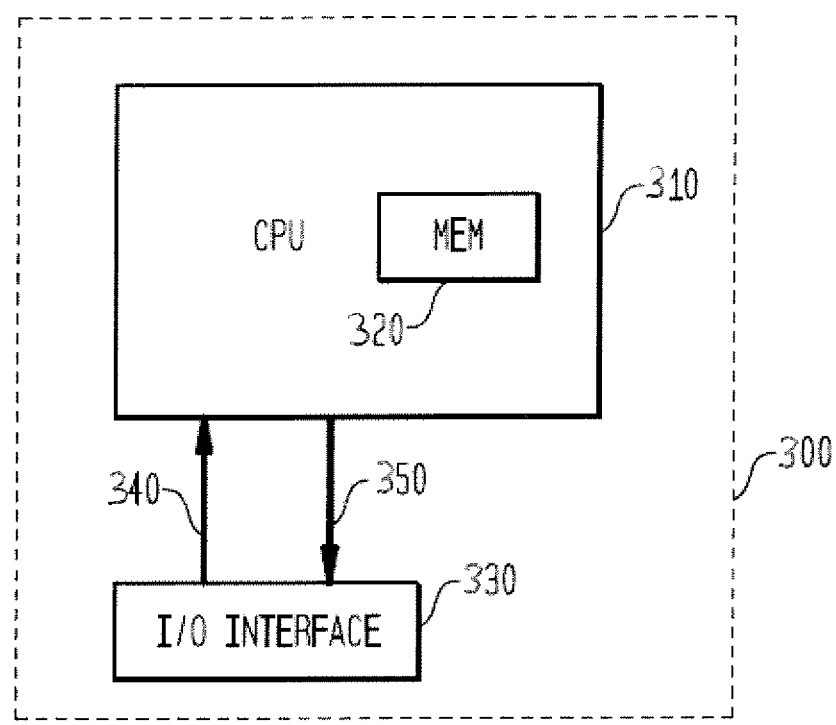
FIG. 3 is a block and schematic diagram illustrating an information processing apparatus having a processor in accordance with an embodiment of the invention.

FIG. 3 illustrates a information processing apparatus 300 in accordance with an embodiment of the invention. As shown in FIG. 3, the information processing apparatus can include a central processing unit (CPU) 310 provided with a memory 320. The CPU 310 may include a single processor or a plurality of processors arranged to execute instructions of a program in a parallel or semi-parallel manner. An input output (I/O) interface 330 can be provided for inputting a program including instructions and data to the CPU 310 for execution of the instructions or portion thereof and for outputting the results of executing the instructions. The I/O interface 330 may include an optical, magnetic or electrical scanning or reading function and may include one or more types of equipment for reading the contents of storage media, which are defined as including but not limited to a magnetic disk, magneto-optic disk, read/write and/or read only optical disc, tape, removable or non-removable disk drive and/or removable or non-removable memory, e.g., a semiconductor memory such as a memory card, and other sources of stored information that can be read optically, magnetically or electrically. In addition to or in place thereof, the I/O interface can include a network interface such as a modem or network adapter card for permitting transfer of information to and from a network. The I/O interface 330 may include a display for outputting information to and/or inputting information from a user. The I/O interface 330 may additionally include one or more user interface devices such as a keyboard, mouse, speaker, joystick, scanner, printer, etc. and the like. To the extent that any of the above described types of storage media are present at the I/O interface, a program containing a set of instructions that is stored in such storage medium can be transferred as input 340 between the I/O interface 330 and the CPU 310. In addition to the program, a set of data to be operated upon by the instructions is also input over the I/O interface 330. Once the program and the data set to be operated upon have been loaded into the CPU 310, the CPU then executes the set of instructions of the program relative to the data and provides output 350 to the I/O interface 330 connected thereto.

In an embodiment, a program containing instructions for performing a method according to an embodiment of the invention is stored on one or more removable storage media to be provided to the I/O interface 330 and loaded into the CPU 310. Alternatively, the program containing the instructions is transferred from a storage medium such as a memory of one or more computers or other storage devices of a network to a modem, network adapter or other device of the I/O interface 330 and further transferred therefrom to the CPU 310. After the CPU 310 receives and loads the program into memory, the program is then executed relative to the set of data provided to the CPU 310. In such way, the foregoing methods can be performed by execution of a program thereon by an information processing apparatus.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of generating a test case for testing a program, the program containing a set of computer-readable instructions recorded on a computer-readable medium, at least some of the instructions being conditionally executable by a processor upon occurrence of a constraint, the method comprising executing instructions by a processor to perform:
    a) analyzing at least some of the instructions to identify basic blocks and superblocks and to determine the constraints thereof, each basic block containing at least one executable instruction, each superblock containing a plurality of basic blocks, wherein all basic blocks of each superblock require execution whenever any basic block thereof requires execution;
    b) determining respective weights of superblocks, each weight representative of a number of basic blocks which require execution when the superblock is executed;
    c) determining the constraints which cause a superblock having a highest weight to be executed; and
    d) using the determined constraints to generate at least one test case which, upon execution of the program, is capable of causing the high-weighted superblock to be executed,
    wherein the test case is a first test case, the method further comprising,
    (e) after performing step (d), determining respective weights of remaining superblocks whose execution is not required when executing the program using the first test case,
    (f) determining the constraints which cause remaining superblocks to be executed, the remaining superblocks having different weights; and
    (g) using the constraints determined in step (f) to generate at least one second test case which, upon execution of the program, is capable of causing at least one superblock selected from the remaining superblocks to be executed.

2. A method as claimed in claim 1, wherein the high weight is a highest determined weight for any of the superblocks.

3. A method as claimed in claim 1, wherein the at least one selected superblock has a higher weight than at least one other of the remaining superblocks.

4. A method of testing a program using a test case as generated according to the method as claimed in claim 1, the method of testing further comprising executing the program using the test case.

5. A method of generating a test case as claimed in claim 1, wherein step (a) includes reading the at least some instructions prior to executing the instructions and determining at least some of the constraints prior to executing the at least some instructions.

6. A method as claimed in claim 1, further comprising generating a seed test ease for enabling generating a test case.

7. An information processing apparatus comprising: a processor; and
    instructions executable by the processor to perform a method of generating a test case for testing a program containing a set of instructions recorded on a computer-readable medium, the method including:
    a) analyzing at least some of the instructions to identify basic blocks and superblocks and to determine the constraints thereof, each basic block containing at least one executable instruction, each superblock containing a plurality of basic blocks, wherein all basic blocks of each superblock require execution whenever any basic block thereof requires execution;
    b) determining respective weights of superblocks, each weight representative of a number of basic blocks which require execution when the superblock is executed;
    c) determining the constraints which cause a superblock having a high highest weight to be executed; and
    d) using the determined constraints to generate at least one test case which, upon execution of the program, is capable of causing the high-weighted superblock to be executed,
    wherein the test case is a first test case, the method further comprising,
    (e) after performing step (d), determining respective weights of remaining superblocks whose execution is not required when executing the program using the first test case,
    (f) determining the constraints which cause remaining superblocks to be executed, the remaining superblocks having different weights; and
    (g) using the constraints determined in step (f) to generate at least one second test case which, upon execution of the program, is capable of causing at least one superblock Selected from the remaining superblocks to be executed.

8. An information processing apparatus as claimed in claim 7, wherein the high weight is a highest determined weight for any of the superblocks.

9. An information processing apparatus as claimed in claim 7, wherein the at least one selected superblock has a higher weight than at least one other of the remaining superblocks.

10. An information processing apparatus as claimed in claim 7, wherein the method further comprises executing the program using the test case.

11. An information processing apparatus as claimed in claim 7, wherein step (a) of the method includes reading the at least some instructions prior to executing the instructions and determining at least some of the constraints prior to executing the at least some instructions.

12. An information processing apparatus in claim 7, further comprising generating a seed test case for enabling generating a test case.

13. A non-transitory computer-readable medium having instructions stored thereon, the instructions being executable by a processor to perform a method of generating a test case for testing a program, the program containing a set of instructions recorded on a computer-readable medium, the method including:
   a) analyzing at least some of the instructions to identify basic blocks and superblocks and to determine the constraints thereof, each basic block containing at least one executable instruction, each superblock containing a plurality of basic blocks, wherein all basic blocks of each superblock require execution whenever any basic block thereof requires execution;
   b) determining respective weights of superblocks, each weight representative of a number of basic blocks which require execution when the superblock is executed;
   c) determining the constraints which cause a superblock having a highest weight to be executed; and
   d) using the determined constraints to generate at least one test case which, upon execution of the program, is capable of causing the high-weighted superblock to be executed,
   wherein the test case is a first test case, the method further comprising,
   (e) after performing step (d), determining respective weights of remaining superblocks whose execution is not required when executing the program using the first test case,
   (f) deter mining the constraints which cause remaining superblocks to be executed, the remaining superblocks having different weights; and
   (g) using the constraints determined in step (f) to generate at least one second test case which, upon execution of the program, is capable of causing at least one superblock selected from the remaining superblocks to be executed.

14. A non-transitory computer-readable medium as claimed in claim 13, wherein the high weight is a highest determined weight for any of the superblocks.

15. A non-transitory computer-readable medium as claimed in claim 13, wherein the at least one selected superblock has a higher weight than at least one other of the remaining superblocks.

16. A non-transitory computer-readable medium as claimed in claim 13, wherein the method further comprises executing the program using the test case.

17. A non-transitory computer-readable medium as claimed in claim 13, wherein step (a) of the method includes reading the at least some instructions prior to executing the instructions and determining at least some of the constraints prior to executing the at least some instructions.

18. A computer-readable medium as claimed in claim 13, further comprising generating a seed test case for enabling generating a test case.

* * * * *

UNITED STATES PATENT AND TRADEMARK OFFICE
CERTIFICATE OF CORRECTION

PATENT NO. : 8,572,555 B2  Page 1 of 1
APPLICATION NO. : 12/632859
DATED : October 29, 2013
INVENTOR(S) : Alberi et al.

It is certified that error appears in the above-identified patent and that said Letters Patent is hereby corrected as shown below:

In the Specification

In Column 5, Line 1, delete "not" and insert -- not a --, therefor.

In Column 6, Line 42, delete "a information" and insert -- an information --, therefor.

In the Claims

In Column 7, Line 60, in Claim 1, delete "comprising," and insert -- comprising: --, therefor.

In Column 8, Line 20, in Claim 6, delete "ease" and insert -- case --, therefor.

In Column 8, Line 38, in Claim 7, delete "high highest" and insert -- highest --, therefor.

In Column 8, Line 44, in Claim 7, delete "comprising," and insert -- comprising: --, therefor.

In Column 8, Line 55, in Claim 7, delete "Selected" and insert -- selected --, therefor.

In Column 9, Line 30, in Claim 13, delete "comprising," and insert -- comprising: --, therefor.

In Column 10, Line 5, in Claim 13, delete "deter mining" and insert -- determining --, therefor.

Signed and Sealed this
Twenty-eighth Day of October, 2014

Michelle K. Lee
*Deputy Director of the United States Patent and Trademark Office*